May 12, 1925.  
E. J. GLACKIN  
PNEUMATIC TIRED VEHICLE  
Filed Oct. 23, 1924

Witness:  
Richard J. Jacker

Inventor:  
Edward J. Glackin  
By John Howard McElroy  
His Atty.

May 12, 1925.

E. J. GLACKIN

PNEUMATIC TIRED VEHICLE

Filed Oct. 23, 1924

Witness:
Richard J. Jacker

Inventor:
Edward J. Glackin
By John Howard McElroy
his Atty.

Patented May 12, 1925.

1,537,113

UNITED STATES PATENT OFFICE.

EDWARD J. GLACKIN, OF CHICAGO, ILLINOIS.

PNEUMATIC TIRED VEHICLE.

Application filed October 23, 1924. Serial No. 745,345.

*To all whom it may concern:*

Be it known that I, EDWARD J. GLACKIN, a citizen of the United States, and a resident of Chicago, in the county of Cook and State of Illinois, have invented certain new and useful Improvements in Pneumatic Tired Vehicles, of which the following is a specification.

My invention is concerned with pneumatic-tired vehicles, and is designed to produce a device of the class described in which one or more of the spare tires now customarily carried upon such devices may be interposed between the chassis and the body in such a manner that said tire is utilized as a cushion to take up some of the vibration or movement given to the chassis by reason of its being driven over rough roads and at least partially prevent its being communicated to the body, thus making the vehicle ride easier than it would without my invention.

To this end, I mount firmly upon the body or chassis a spare-tire holder adapted to engage the tire by its inner periphery, and upon the other member, the chassis or body as the case may be, abutments or an abutment with which the outer periphery of the tire engages, so that any relative movement will be cushioned by the interposed tire.

To illustrate my invention, I annex hereto two sheets of drawings, in which the same reference characters are used to designate identical parts in all the figures, of which,—

Figure 2:
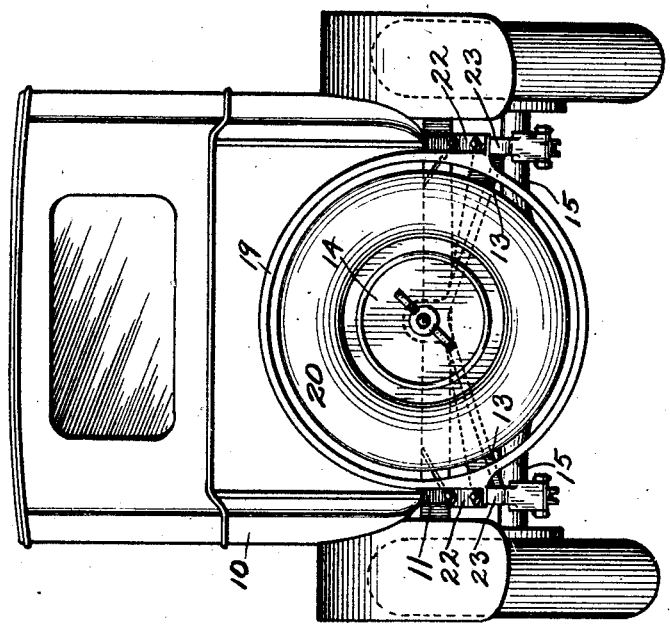
Fig. 2 is a rear elevation of the same.
Figure 1:
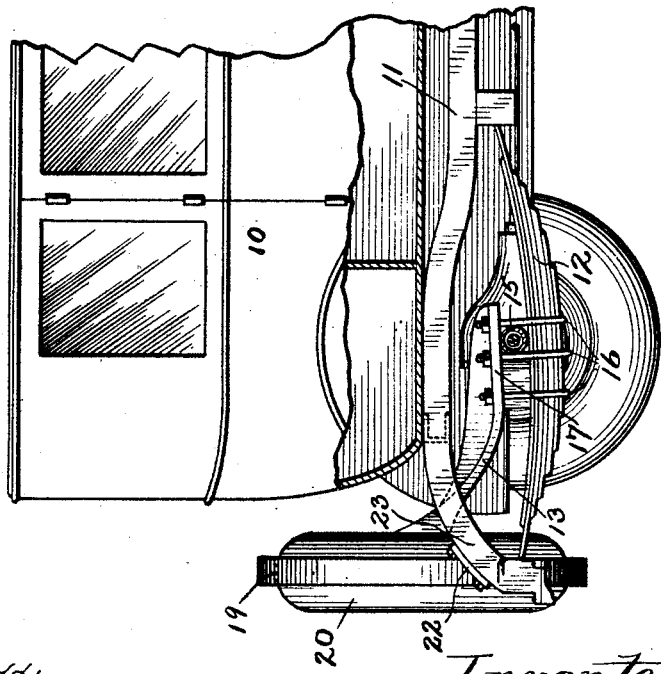
Fig. 1 is a side elevation of the rear portion of a car having my invention applied thereto, with a portion of the same in vertical section to show more clearly the construction.

In all the sheets of drawings, 10 represents the customary body mounted upon the customary chassis 11, and preferably having the customary springs 12 interposed between said chassis and body. In Figs. 1 and 2, the casting 13, supporting at its outer and rear end the tire-supporting disk 14, is secured to the axle casing 15 by the U-bolts 16, which embrace the adjacent spring 12, the axle, and the horizontal ends 17 of said casting 13, which, as seen in Fig. 2, is of a V-shape in its general outline. The abutment preferably takes the form of a ring 19, and it will be understood that I might have the spare tire 20 interposed between the supporting ring 14 and the abutment engaged by said abutment ring 19 throughout its entire length, but I preferably make the inner periphery of the ring 19 somewhat greater than the outer periphery of the tire 20, as indicated in the drawings, so that they do not contact when the vehicle is empty, but only when it is loaded, as in this way a softer cushion is obtained. This abutment ring 19 has projecting from the sides thereof the flanges 22, which are bolted onto the ends 23 of the side bars connected to the body, and which have the rear ends of the springs 12 pivoted thereto in the customary manner.

Figure 4:
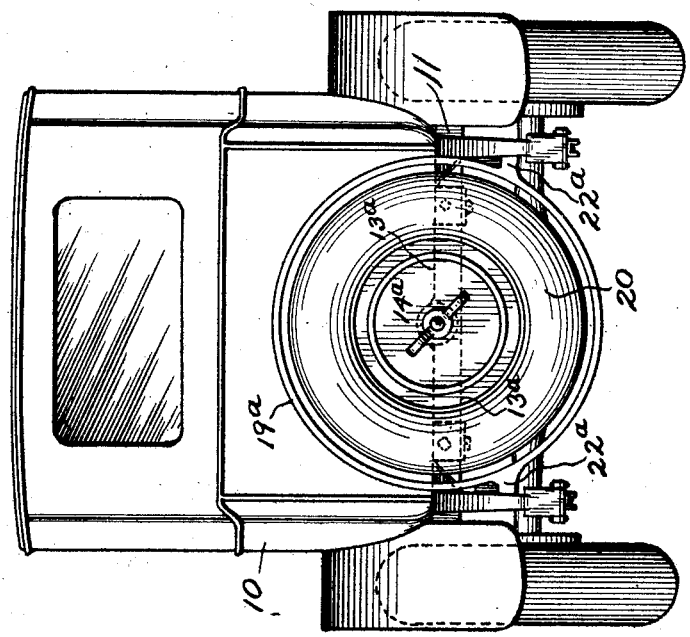
Figs. 3 and 4 are similar to Figs. 1 and 2, but showing a modified construction.
Figure 3:
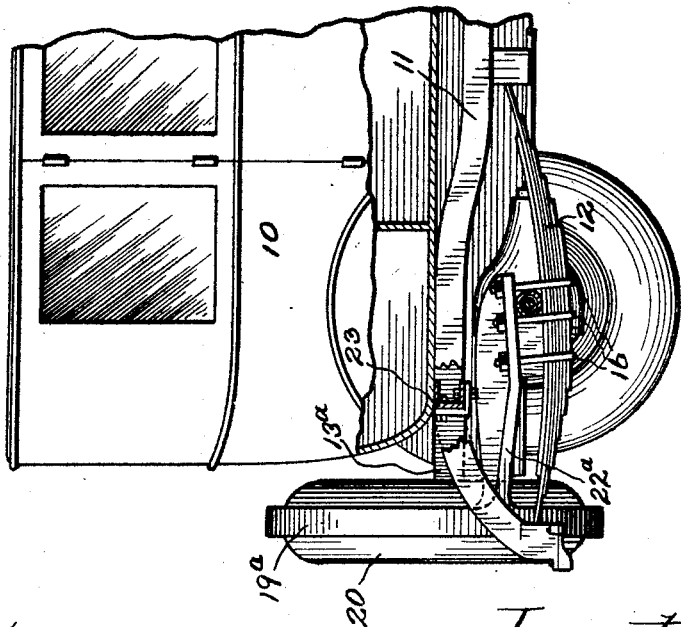

In Figs. 3 and 4, I have shown a reversal, in that the abutment ring 19$^a$ is supported from the pair of arms 22$^a$, which are secured to the axle casing and to the springs 12 by the U-bolts 16 in the same manner as the ends 17 of the arms 13 were secured in the other form. The spare-tire supporting-ring 14$^a$ is supported from the body by the arms 13$^a$, which are bolted to the transverse U-bar 23 forming a part of the body framework. It will be understood that where balloon tires and similar large tires that are not inflated so hard are employed, they may be substantially fully inflated, whereas a better cushioning effect will be secured with smaller tires if they are only partially inflated.

While I have shown and described my invention as embodied in forms which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a pneumatic-tired vehicle, the combination with a chassis member, of a body member mounted thereon and movable relative thereto, a tire support carried by one member, a spare tire mounted on said support, and an abutment carried by the other member adapted to co-operate with the tire, substantially as and for the purpose described.

2. In a pneumatic-tired vehicle, the combination with a chassis, of a body mounted thereon and movable relative thereto, a tire support carried by the chassis, a spare tire mounted on said support, and an abutment carried by the body adapted to co-operate with the outer periphery of the tire, substantially as and for the purpose described.

3. In a pneumatic-tired vehicle, the combination with a chassis, of a body mounted thereon and movable relative thereto, supporting springs connected to the chassis at their center and to the body at their ends, a tire-supporting frame bolted at its inner ends to the spring and axle casing, a spare tire mounted on said support, and an abutment carried by the body adapted to co-operate with the outer periphery of the tire, substantially as and for the purpose described.

4. In a pneumatic-tired vehicle, the combination with a chassis, of a body mounted thereon and movable relative thereto, supporting springs connected to the chassis at their center and to the body at their ends, a tire-supporting frame bolted at its inner ends to the spring and axle casing, a spare tire mounted on said support, and an abutment ring secured by brackets carried thereby on the inner end of the body side-bars, substantially as and for the purpose described.

5. In a pneumatic-tired vehicle, the combination with a chassis, of a body mounted thereon and movable relative thereto, a tire support carried by the body, a spare tire mounted on said support, and an abutment carried by the chassis adapted to co-operate with the outer periphery of the tire, substantially as and for the purpose described.

6. In a pneumatic-tired vehicle, the combination with a chassis, of a body mounted thereon and movable relative thereto, bow springs secured at their center to the chassis and at their outer ends to the body, a spare-tire support secured to the rear of the body, a spare tire mounted on said support, and an abutment ring surrounding the spare tire and supported by a pair of brackets bolted to the center of the springs and to the axle casing.

In witness whereof, I have hereunto set hand, this 14th day of October, 1924.

EDWARD J. GLACKIN.

In the presence of a witness:
JOHN HOWARD MCELROY.